(12) United States Patent
Spahn et al.

(10) Patent No.: US 10,513,206 B2
(45) Date of Patent: Dec. 24, 2019

(54) VEHICLE SEAT

(71) Applicant: Ford Global Technologies, LLC, Dearborn, MI (US)

(72) Inventors: Brian Spahn, Plymouth, MI (US); Benjamin Yilma, Canton, MI (US); Alan George Dry, Grosse Pointe Woods, MI (US); Johnathan Andrew Line, Northville, MI (US); S. M. Akbar Berry, Windsor (CA); Jeffrey Charles Paddock, Dearborn Heights, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 123 days.

(21) Appl. No.: 15/820,216

(22) Filed: Nov. 21, 2017

(65) Prior Publication Data
US 2019/0152359 A1    May 23, 2019

(51) Int. Cl.
| | | |
|---|---|---|
| *B60N 2/427* | (2006.01) | |
| *B60R 21/207* | (2006.01) | |
| *B60R 21/2338* | (2011.01) | |
| *B60R 21/0136* | (2006.01) | |
| *B60R 21/02* | (2006.01) | |
| *B60R 21/00* | (2006.01) | |
| *B60R 21/231* | (2011.01) | |
| *B60R 21/233* | (2006.01) | |

(52) U.S. Cl.
CPC ........ *B60N 2/4279* (2013.01); *B60R 21/0136* (2013.01); *B60R 21/207* (2013.01); *B60R 21/2338* (2013.01); *B60R 21/231* (2013.01); *B60R 21/233* (2013.01); *B60R 2021/0032* (2013.01); *B60R 2021/022* (2013.01); *B60R 2021/0273* (2013.01); *B60R 2021/23107* (2013.01)

(58) Field of Classification Search
CPC . B60R 21/207; B60R 21/233; B60R 21/2338; B60R 21/231; B60R 2021/0273; B60R 2021/23107; B60R 2021/022
See application file for complete search history.

(56) References Cited

U.S. PATENT DOCUMENTS

| | | | | |
|---|---|---|---|---|
| 3,623,768 | A  * | 11/1971 | Capener | B60R 21/207 297/330 |
| 8,820,830 | B2 * | 9/2014 | Lich | B60N 2/0276 297/216.13 |
| 2005/0206138 | A1* | 9/2005 | Breuninger | B60R 21/231 280/729 |
| 2011/0254330 | A1* | 10/2011 | Lich | B60N 2/0276 297/216.1 |

(Continued)

FOREIGN PATENT DOCUMENTS

| | | |
|---|---|---|
| DE | 102012221533 A1 | 5/2014 |
| FR | 2927592 B1 | 3/2010 |
| GB | 1189985 A | 4/1970 |

*Primary Examiner* — Karen Beck
(74) *Attorney, Agent, or Firm* — Frank A. MacKenzie; Bejin Bieneman PLC (57) ABSTRACT

A vehicle seat includes a seat back having a front surface and a rear surface, a panel movable along the rear surface from a stowed position adjacent the rear surface to a deployed position facing the front surface, and an airbag supported on the panel and inflatable toward the front surface to an inflated position in which the airbag contacts the panel.

20 Claims, 11 Drawing Sheets

(56) References Cited

U.S. PATENT DOCUMENTS

| | | | |
|---|---|---|---|
| 2012/0007408 A1* | 1/2012 | Freienstein | B60N 2/0276 |
| | | | 297/464 |
| 2016/0052477 A1 | 2/2016 | Tobata et al. | |
| 2016/0082915 A1* | 3/2016 | Madaras | B60R 21/231 |
| | | | 297/216.2 |
| 2016/0347272 A1* | 12/2016 | Kato | B60R 21/207 |
| 2017/0136976 A1* | 5/2017 | Ohno | B60N 2/888 |
| 2017/0158155 A1* | 6/2017 | Ohno | B60R 21/207 |
| 2017/0259704 A1* | 9/2017 | Madaras | B60N 2/0276 |
| 2017/0291564 A1* | 10/2017 | Ohmi | B60N 2/838 |
| 2017/0291569 A1* | 10/2017 | Sugie | B60R 21/01552 |
| 2018/0354449 A1* | 12/2018 | Markusic | B60R 21/23138 |
| 2019/0023214 A1* | 1/2019 | Kitagawa | B60R 21/207 |
| 2019/0054890 A1* | 2/2019 | Kwon | B60R 21/23138 |
| 2019/0071046 A1* | 3/2019 | Dry | B60R 21/231 |
| 2019/0077359 A1* | 3/2019 | Kim | B60R 21/23138 |
| 2019/0092264 A1* | 3/2019 | Spahn | B60R 21/207 |

\* cited by examiner

VEHICLE SEAT

BACKGROUND

An interior of a vehicle, such as automobile, may include various safety devices for absorbing energy from an occupant of the vehicle during an impact of the vehicle. For example, the vehicle may include an airbag supported by a steering wheel or a vehicle seat. The airbag may be configured to absorb energy from the occupant during a vehicle impact.

Automobiles are subject to a variety of crash tests, including standard tests regulated by the National Highway Traffic Safety Administration (NHTSA). For example, these tests may be directed toward oblique impacts, i.e., impacts that occur at an angle of 10-50 degrees relative to a vehicle's trajectory. During the oblique impact, the occupant may move forward and laterally, and a seat belt may impart a load onto a chest of the occupant.

DETAILED DESCRIPTION

A vehicle seat includes a seat back having a front surface and a rear surface, a panel movable along the rear surface from a stowed position adjacent the rear surface to a deployed position facing the front surface, and an airbag supported on the panel and inflatable toward the front surface to an inflated position in which the airbag contacts the panel.

The seat may further include a tether extending from the front surface to the panel when the panel is in the deployed position.

The seat may further include a net extending from the front surface to the panel when the panel is in the deployed position.

The seat may further include a second panel movable away from the panel along to the rear surface from a stowed position adjacent the panel to a deployed position facing the front surface.

When the panel and the second panel are each in the deployed position and the airbag is in the inflated position, the airbag may contact the panel and the second panel.

The panel and the second panel may define a gap when the panel and the second panel are in the respective deployed positions, and the airbag may extend across the gap in the inflated position from the panel to the second panel.

The seat may further include a second airbag supported in the panel inflatable to an inflated position, wherein when the panel is in the deployed position, the second airbag may be beneath the airbag.

The seat may further include a motor disposed in the rear surface and connected to the panel. The motor may be arranged to move the panel to the deployed position.

The seat may further include a headrest and a second airbag disposed in the headrest inflatable to an inflated position, wherein when the panel is in the deployed position, the second airbag may be in the inflated position and may extend from the headrest to the panel.

The seat may further include an impact sensor, wherein the panel may be arranged to move to the deployed position upon receiving an instruction from the impact sensor.

The seat may further include a pyrotechnic device disposed in the rear surface and may be arranged to move the panel to the deployed position.

An energy absorbing system includes a seat, a first panel movably attached to the seat and extendable to a deployed position, a second panel movably attached to the seat and extendable to a deployed position, a pinion engaged with the first panel and the second panel and attached to the seat, and an airbag supported on the first panel inflatable toward the seat to an inflated position. When the first panel is in the deployed position and the airbag is in the inflated position, the airbag contacts the first and second panels.

The first panel and the second panel may define a gap when the first panel and the second panel are in the respective deployed positions, and the airbag may extend across the gap in the inflated position from the first panel to the second panel.

The system may further include a tether extending from the seat to the first panel when the first panel is in the deployed position.

The system may further include a net extending from the seat to the first panel when the first panel is in the deployed position.

The system may further include a second airbag supported in the first panel inflatable to an inflated position, wherein when the first panel is in the deployed position, the second airbag may be beneath the airbag.

The system may further include a headrest and a second airbag disposed in the headrest inflatable to an inflated position, wherein when the first panel is in the deployed position, the second airbag may be in the inflated position and may extend from the headrest to the first panel.

The pinion may be arranged to extend the first panel and the second panel to the respective deployed positions.

The system may further include an impact sensor, wherein the pinion may be arranged to extend the first panel to the deployed position upon receiving an instruction from the impact sensor.

With reference to the Figures, wherein like numerals indicate like parts throughout the several views, a vehicle seat 10 includes a seat back 12 having a front surface 14 and a rear surface 16, a panel 18, and an airbag 20 supported on the panel 18. The panel 18 is movable along the rear surface 16 from a stowed position adjacent the rear surface 16 to a deployed position facing the front surface 14. The airbag 20 is inflatable toward the front surface 14 to an inflated position in which the airbag 20 contacts the panel 18.

The panel 18 and a second panel 22 may absorb energy from an occupant of the vehicle 24 during a vehicle impact and/or the airbag 20 may absorb energy from the occupant during the vehicle impact. Specifically, the panel 18 and the second panel 22 may absorb energy from the vehicle occupant during a vehicle impact when the vehicle impact is from any direction and when the vehicle seat 10 is facing in any direction. For example, during an oblique impact, the panel 18, the second panel 22, and the airbag 20 may be positioned to absorb energy from the occupant moving laterally and longitudinally. When the occupant moves at an angle relative to forward motion of the vehicle 24, the vehicle seat 10 may absorb energy from the occupant. Thus, the vehicle seat 10 may absorb energy from the occupant during vehicle impacts from a plurality of directions.

Figure 10:
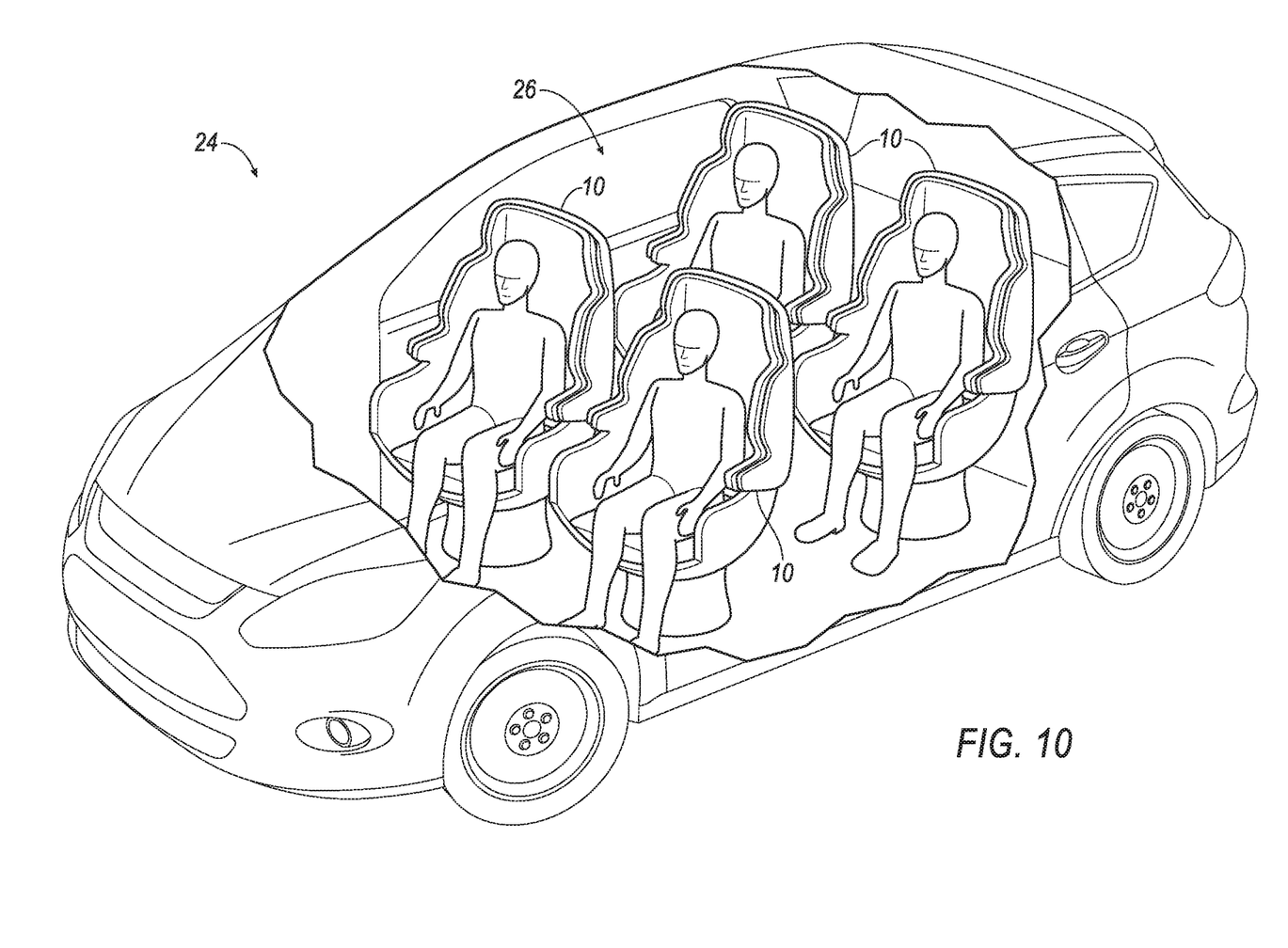
FIG. 10 is a view of a vehicle with the vehicle seat.

As shown in FIG. 10, the vehicle 24 may be any suitable type of vehicle 24, e.g., an automobile, including a sedan, a pick-up truck, a sport-utility vehicle, etc. The vehicle 24 may be an autonomous vehicle. For example, the vehicle 24 may have a computer that may control the operations of the vehicle in an autonomous mode, a semi-autonomous mode, or a non-autonomous mode. For purposes of this disclosure, an autonomous mode is defined as one in which each of vehicle propulsion, braking, and steering are controlled by the computer; in a semi-autonomous mode the computer controls one or two of vehicles propulsion, braking, and steering; in a non-autonomous mode, a human operator controls the vehicle propulsion, braking, and steering. As shown in FIG. 10, the vehicle seats 10 may be oriented in a vehicle-forward direction. Alternatively, the vehicle seats 10 may be rotatable to a position away from the vehicle-forward direction.

Figure 9:
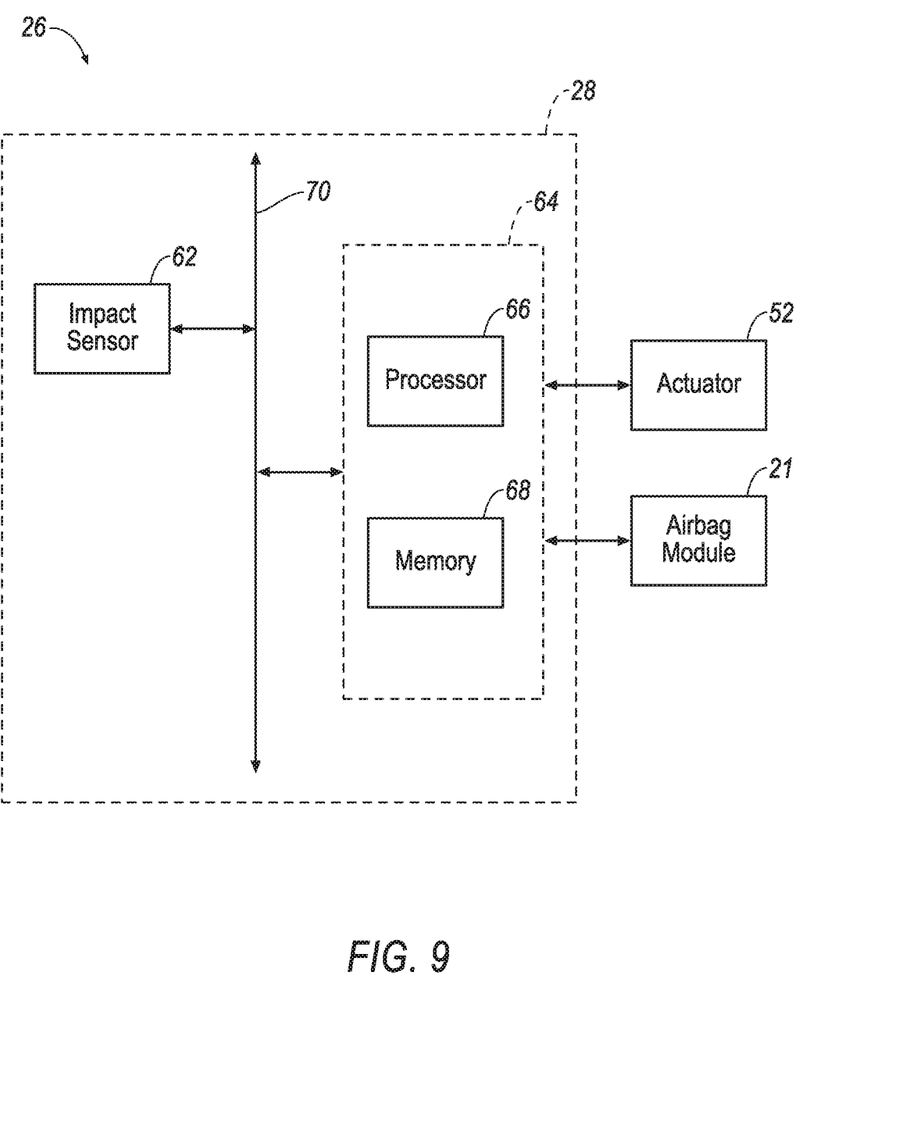
FIG. 9 illustrates an energy absorbing system including an impact sensing subsystem.

The vehicle 24 may include an energy absorbing system 26, as shown in FIGS. 9-10. The energy absorbing system 26 may include the vehicle seat 10 and an impact sensing subsystem 28. The energy absorbing system 26 may absorb energy from a vehicle occupant during the vehicle impact. For example, the energy absorbing system 26 may absorb energy from the vehicle occupant moving laterally and longitudinally during an oblique vehicle impact.

The vehicle seat 10 includes the seat back 12, as shown in FIGS. 1A-8B. The seat back 12 includes the front surface 14 and the rear surface 16. The occupant may lean back onto the seat back 12. The vehicle seat 10 may include a seat bottom 30. The seat bottom 30 may support the occupant from underneath. The seat bottom 30 may extend transverse to the seat back 12.

The vehicle seat 10 includes at least one panel 18. The vehicle seat 10 may include any suitable number of panels 18, 22; the examples shown in the figures include two panels, specifically the panel 18 and a second panel 22. During the vehicle impact, panel 18, 22, e.g., both the panel 18 and the second panel 22, may deploy to absorb energy from the occupant. In such an example, the airbag 20 may inflate to the inflated position and contact the panel 18, 22, e.g., the panel 18 and the second panel 22, absorbing energy from the occupant when the occupant moves in an oblique direction, i.e., a direction transverse to forward or sideways movement of the vehicle 24.

The panel 18 is shown in FIGS. 1A, 2A, 3A, 4A, 5A, 6A, 7A-8B. The panel 18 is movable along the rear surface 16 of the seat back 12 from an undeployed position to a deployed position. In the deployed position, the panel 18 faces the front surface 14 of the seat back 12. The panel 18 may face an occupant sitting in the vehicle seat 10.

The airbag 20 is shown in FIGS. 1A, 2A, 3A, 4A, 5A, 6A-6D, 7A, 8A. The airbag 20 may be supported in the panel 18 and inflatable from an uninflated position to an inflated position. For example, the airbag 20 may be disposed entirely within the panel 18 when the airbag 20 is in the uninflated position and may be fixed to the panel 18 when the airbag 20 is in the inflated position, extending out from the panel 18. When the airbag 20 is in the inflated position and the panel 18 is in the deployed position, the airbag 20 contacts the panel 18 and extends toward the front surface 14 of the seat back 12. The airbag 20 may be part of an airbag module 21 that includes an inflator (not shown) in communication with the impact sensing subsystem 28, as described below. The airbag 20 may be formed of a woven polymer or any other material. As one example, the airbag 20 may be formed of woven nylon yarn, for example, nylon 6-6. Other examples include polyether ether ketone (PEEK), polyetherketoneketone (PEKK), polyester, etc. The woven polymer may include a coating, such as silicone, neoprene, urethane, etc. For example, the coating may be polyorgano siloxane. As another example, the airbag 20 may be formed of thermoplastic elastomer (TPE). A thermoplastic elastomer has both thermoplastic and elastomeric properties. A thermoplastic material becomes pliable above a particular temperature and solidifies upon cooling, and an elastomer generally has a low Young's modulus and a high failure strain. Types of TPEs include styrenic block copolymers, thermoplastic olefins, elastomeric alloys, thermoplastic polyurethanes, thermoplastic copolyesters, and thermoplastic polyamides. The thermoplastic elastomer may be solid, not woven like a fabric.

As set forth above, the vehicle seat 10 may include the second panel 22, as shown in FIGS. 1A-8B. The second panel 22 may be movable away from the panel 18 along to the rear surface 16 from a stowed position adjacent the panel 18 to a deployed position facing the front surface 14. As used herein, the panel 18 and the second panel 22 are "adjacent" to the rear surface 16 when the panel 18 and the second panel 22 extend along the rear surface 16 of the seat back 12, e.g., with the lack of anything therebetween. When the panel 18 and the second panel 22 are adjacent to the rear surface 16, the rear surface 16 is between the panel 18 and the front surface 14 and between the second panel 22 and the front surface 14. The panel 18 and the second panel 22 are "facing" the front surface 14 when the front surface 14 is between the panel 18 and the rear surface 16 and between the second panel 22 and the rear surface 16. When the panel 18 and the second panel 22 are each in the deployed position and the airbag 20 is in the inflated position, the airbag 20 may contact the panel 18 and the second panel 22, i.e., the airbag 20 may engage the panel 18 and the second panel 22, as shown in FIG. 6A. The panel 18 and the second panel 22 may be constructed of an energy-absorbing material, e.g., a resilient polymer, a flexible polymer, a foam, etc. For example, the panel 18 and the second panel 22 may include foam cells covered with a flexible polymer.

The vehicle seat 10 and the panel 18, 22 may include an interface therebetween configured to allow the panel 18, 22 to move to the deployed position. For example, the seat back 12 may include a track 32, as shown in FIGS. 2A-6D. The track 32 may support the panel 18 and the second panel 22. The panel 18 and the second panel 22 may slide along the track 32 from the stowed position to the deployed position. The track 32 may extend from the seat back 12, as shown in FIGS. 2A-6D. Alternatively, the track 32 may be flush with the seat back 12 (not shown).

Figure 4A:
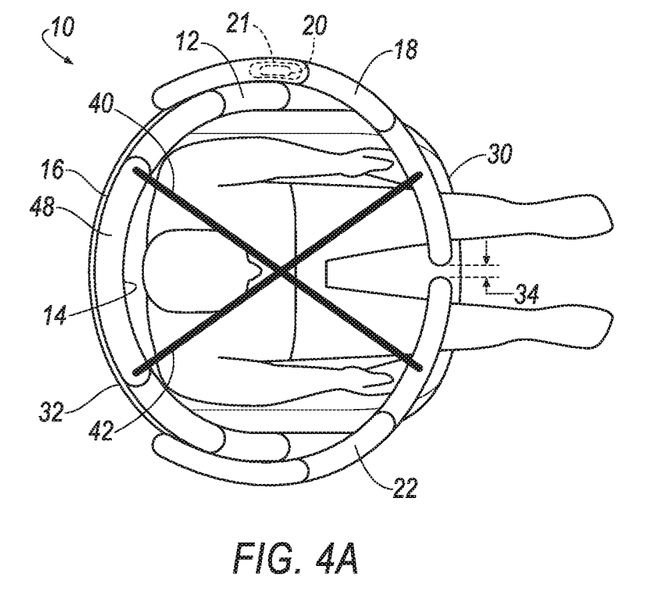
FIGS. 4A-4B illustrate the vehicle seat with a tether.
Figure 5A:
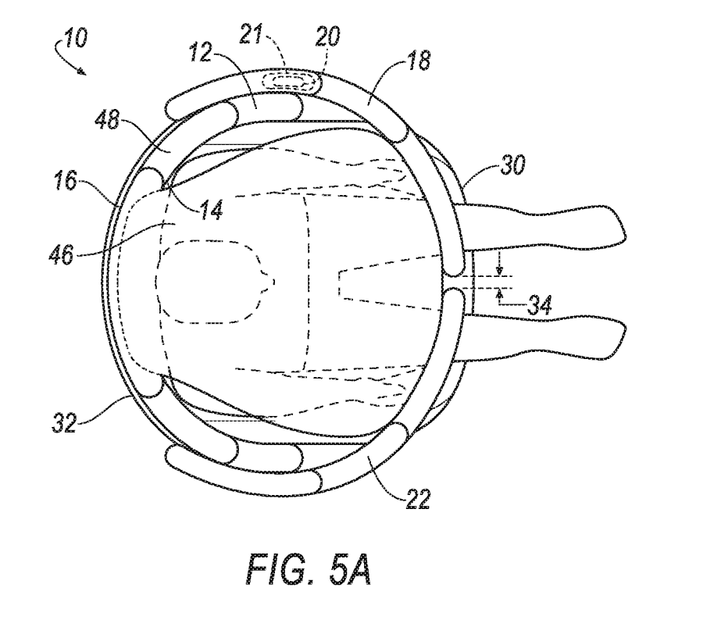
FIGS. 5A-5B illustrate the vehicle seat with an upper airbag.
Figure 6A:
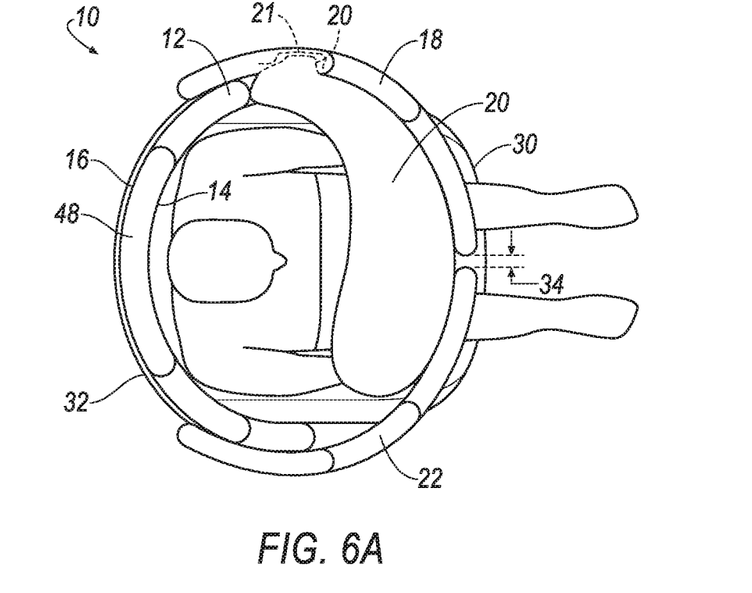
FIGS. 6A-6D illustrate the vehicle seat with the panel in the deployed position and an airbag in an inflated position.
Figure 6B:
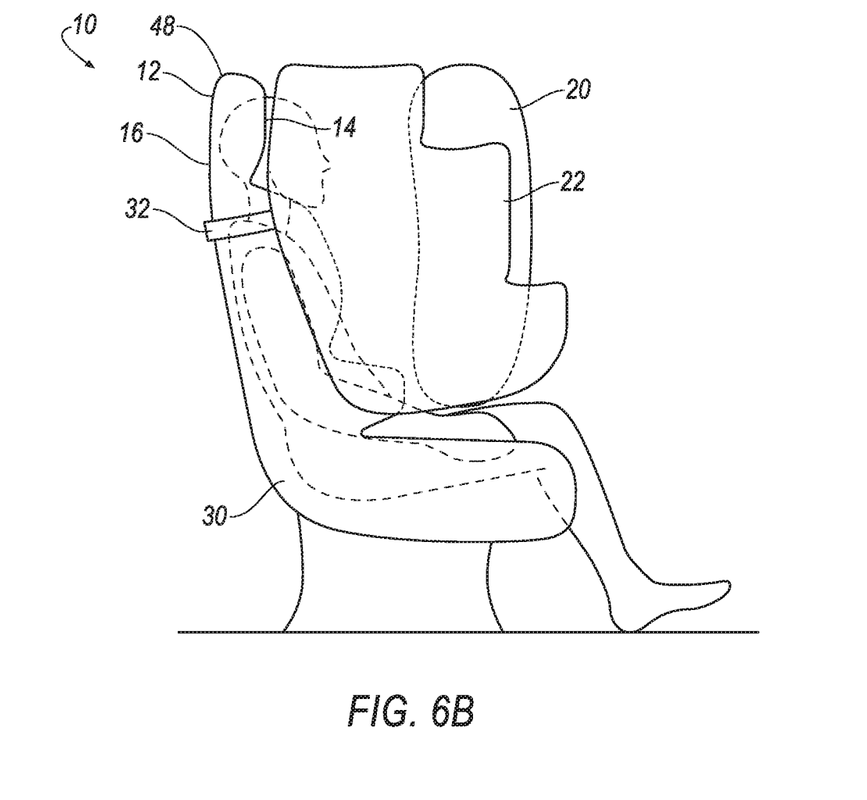

The panel 18 and the second panel 22 may define a gap 34 in the deployed position. FIGS. 2A, 3A, 4A, 5A, and 6A-6B show the panel 18 and the second panel 22 in the deployed position and the gap 34 between the panel 18 and the second panel 22. Alternatively, the panel 18 and the second panel 22 may contact (not shown) in the deployed position. During the vehicle impact, the occupant may move toward the panel 18 and the second panel 22, separating the panel 18 and the second panel 22 at the gap 34. The gap 34 may be defined as the space between the panel 18 and the second panel 22 when not in contact, and the gap 34 may be defined as the line of contact of the panel 18 and the second panel 22 when in contact. When the panel 18 and the second panel 22 are in the respective deployed positions, and the airbag 20 may extend across the gap 34 in the inflated position from the panel 18 to the second panel 22, as shown in FIG. 6A. The airbag 20 extends across the gap 34 when the airbag 20 engages both the panel 18 and the second panel 22 and covers at least a portion of the space defining the gap 34 between the panel 18 and the second panel 22. Alternatively, when the gap 34 is the seam of contact between the panel 18 and the second panel 22, the airbag 20 extends across the gap 34 when the airbag 20 contacts both the panel 18 and the second panel 22 across at least a portion of the seam defining the gap 34. During the vehicle impact, the occupant may contact the airbag 20, preventing the occupant from engaging the gap 34 and separating the panel 18 and the second panel 22.

Figure 6C:
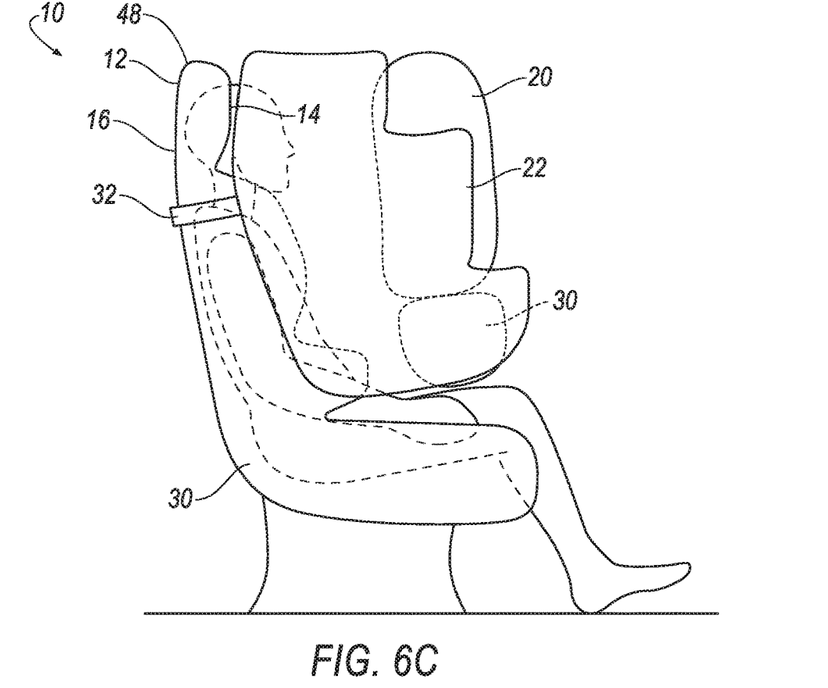
Figure 6D:
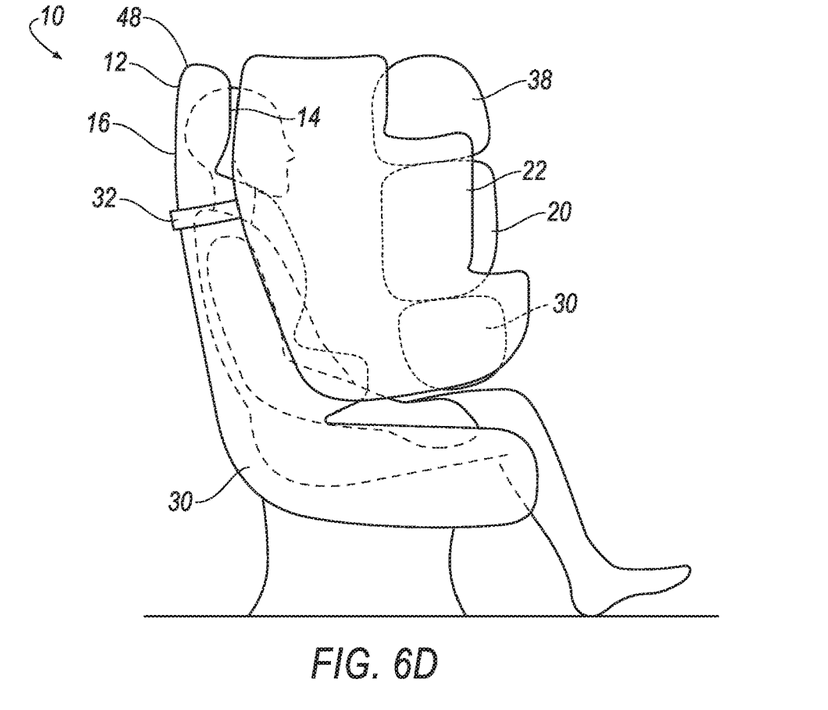

The vehicle seat 10 may absorb energy from different parts of the occupant's body. For example, the vehicle seat 10 may include a second airbag 36, as shown in FIGS. 6C-6D. The second airbag 36 may be supported in the panel 18. Alternatively, the second airbag 36 may be supported in the second panel 22 (not shown). The second airbag 36 may be inflatable to an inflated position. When the panel 18 is in the deployed position, the second airbag 36 may be disposed beneath the airbag 20, as shown in FIGS. 6C-6D. The airbag 20 may be a chest airbag, absorbing energy from the occupant's upper body, and the second airbag 36 may be a pelvis airbag, absorbing energy from the occupant's lower body.

The vehicle seat 10 may include a third airbag 38, as shown in FIG. 6D. The third airbag 38 may be supported in one of the panel 18 and the second panel 22. The airbag 20, the second airbag 36, and the third airbag 38 may be vertically disposed in the respective inflated positions, as shown in FIG. 6D. The airbag 20 may be a chest airbag, absorbing energy from a midsection of the occupant's body, the second airbag 36 may be a pelvis airbag, absorbing energy from the occupant's lower body, and the third airbag 38 may be a head airbag, absorbing energy from the occupant's upper body.

Figure 1A:
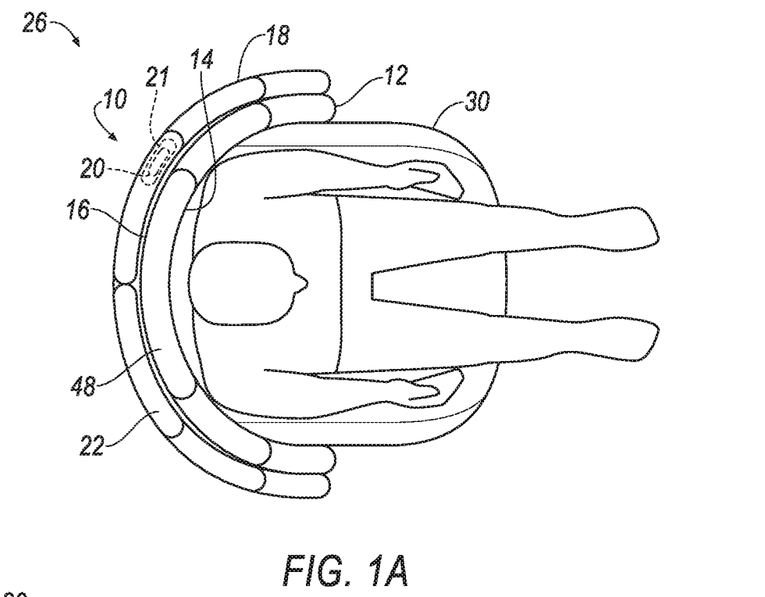
FIGS. 1A-1B illustrate a vehicle seat with a panel in a stowed position.
Figure 1B:
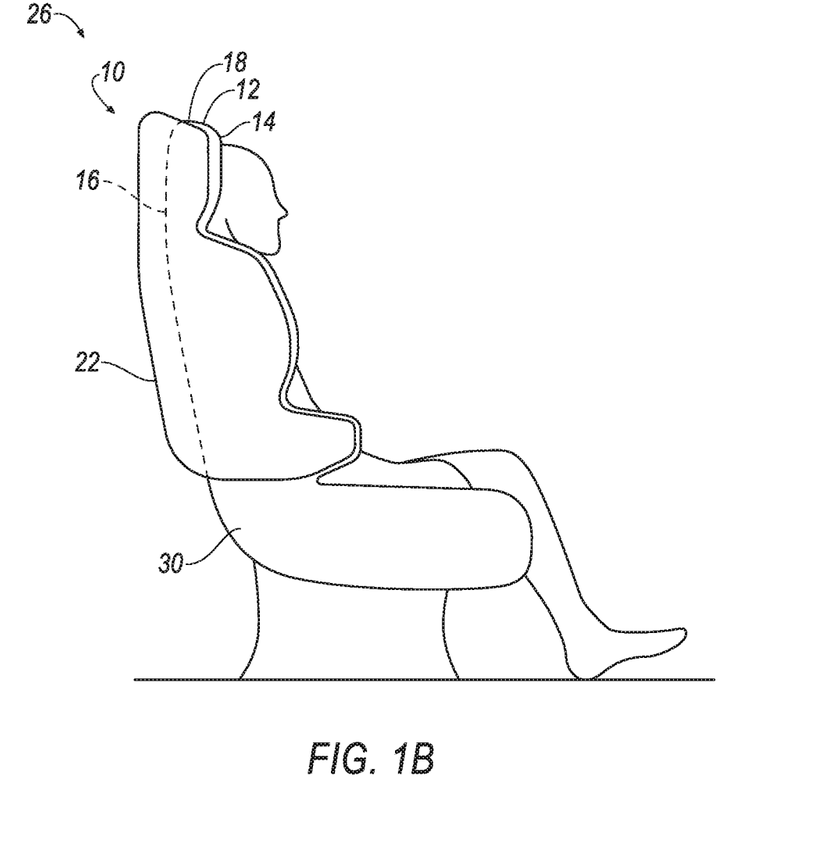
Figure 2A:
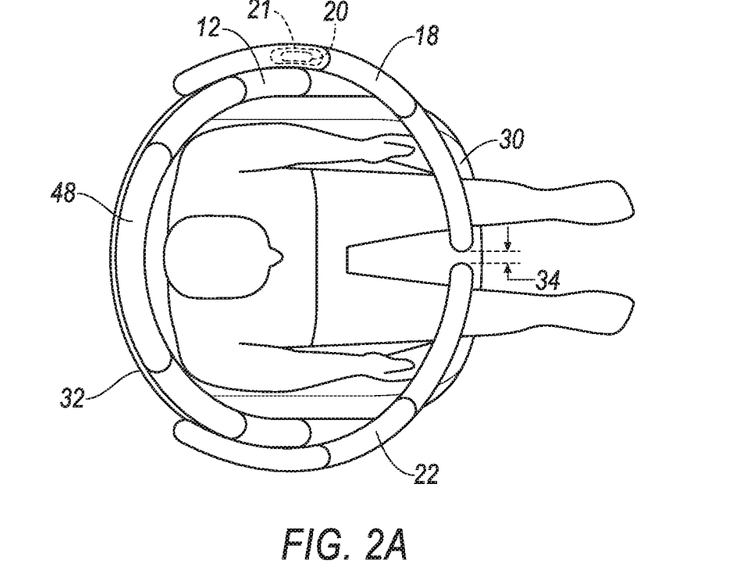
FIGS. 2A-2B illustrate the vehicle seat with the panel in a deployed position.
Figure 2B:
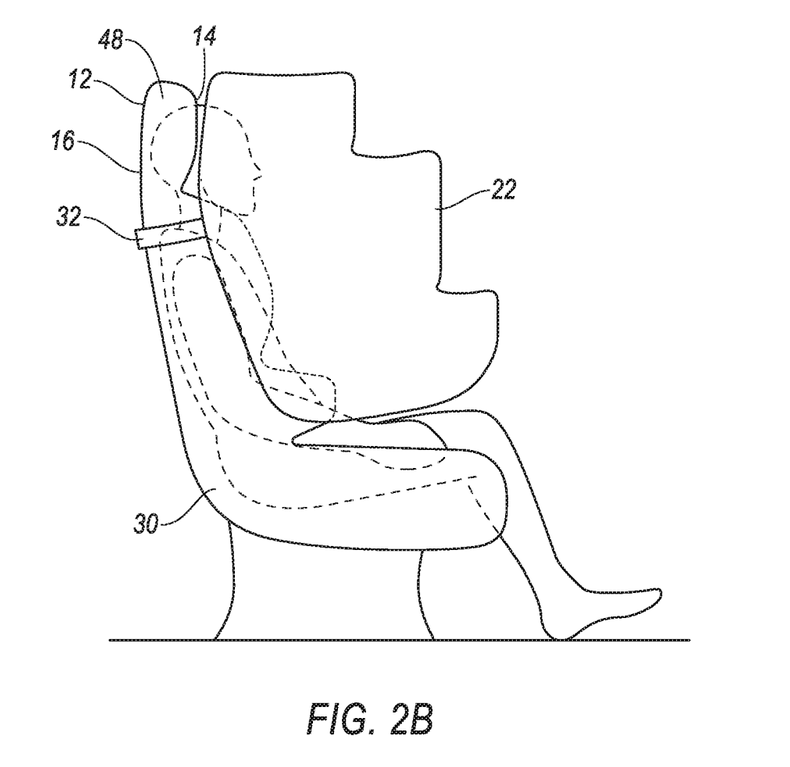
Figure 3A:
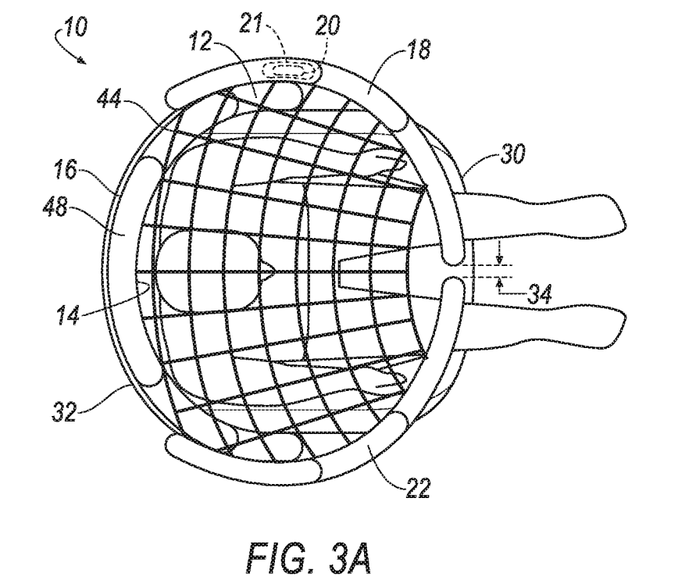
FIGS. 3A-3B illustrate the vehicle seat with a net.
Figure 3B:
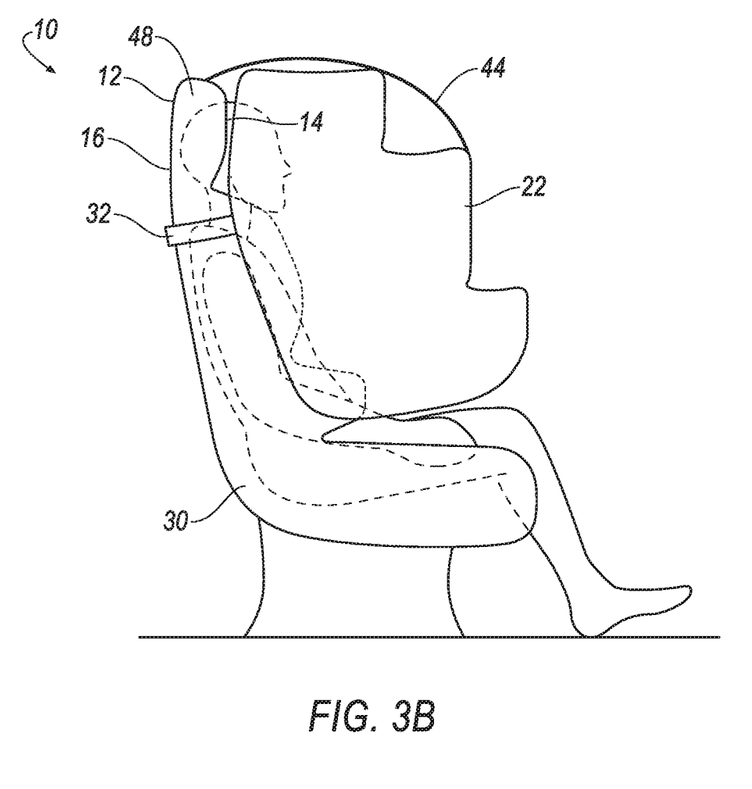
Figure 4B:
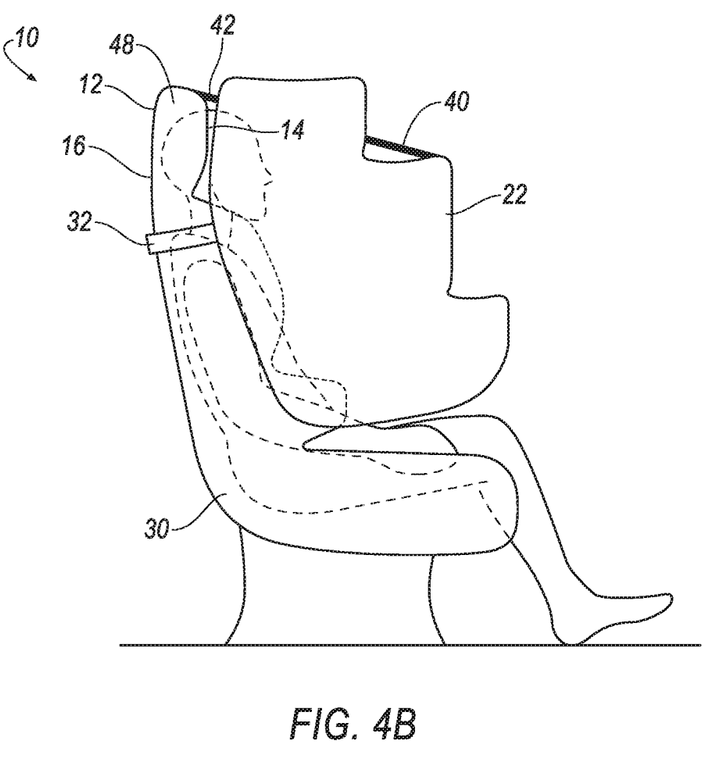
Figure 5B:
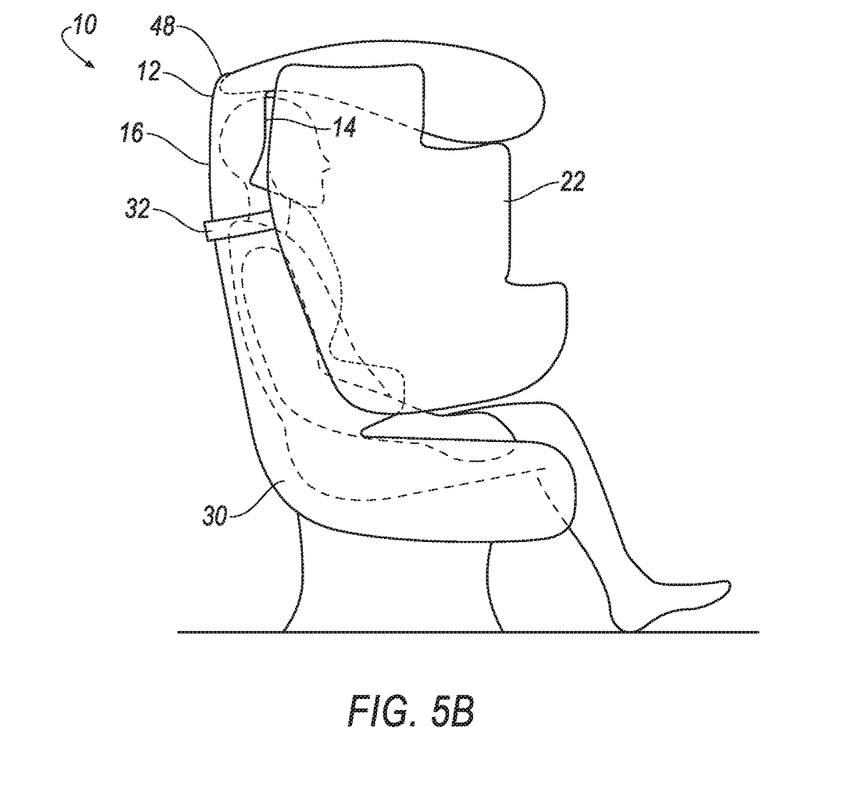

When the panel 18 and the second panel 22 are in the respective deployed positions, the panel 18 and the second panel 22 may be secured to the seat back 12. During the vehicle impact, the panel 18 and the second panel 22 in the deployed position may move. By securing the panel 18 and the second panel 22 to the seat back 12, movement of the panel 18 and the second panel 22 during the vehicle impact may be reduced, and the seat 10 may absorb energy from the vehicle occupant. For example, the panel 18 and the second panel 22 may be secured to the seat back 12 with, e.g., a tether 40 (as shown in FIGS. 4A-4B), a net 44 (as shown in FIGS. 3A-3B), an upper airbag 46 (as shown in FIGS. 5A-5B), etc. Alternatively, the panel 18 and the second panel 22 may be secured to the seat back 12 with a different device, e.g., a fastener, a cord, a sheet, etc.

The vehicle seat 10 may include the tether 40, as shown in FIGS. 4A-4B. The tether 40 may extend from the front surface 14 to the panel 18 when the panel 18 is in the deployed position. The tether 40 may secure the panel 18 to the seat back 12, reducing movement of the panel 18 during the vehicle impact. The vehicle seat 10 may include a second tether 42, as shown in FIG. 4A-4B. The second tether 42 may extend from the front surface 14 to the second panel 22 when the second panel 22 is in the deployed position. The tether 40 and the second tether 42 may be constructed of a flexible material, e.g., an elastic fabric. The tether 40 and the second tether 42 may form an X-shape when the panel 18 and the second panel 22 are in the respective deployed positions. The tether 40 and the second tether 42 may secure the panel 18 and the second panel 22 during the vehicle impact.

The vehicle seat 10 may include the net 44, as shown in FIGS. 3A-3B. The net 44 may be a patterned arrangement of fibers, e.g., a mesh, a checkerboard, etc. The net 44 may extend from the front surface 14 to the panel 18 when the panel 18 is in the deployed position. The net 44 may extend from the front surface 14 to the second panel 22 when the second panel 22 is in the deployed position. The net 44 may secure the panel 18 and the second panel 22 during the vehicle impact. The net 44 may absorb energy from the occupant moving laterally during the vehicle impact.

The vehicle seat 10 may include the upper airbag 46, as shown in FIGS. 5A-5B. The upper airbag 46 may extend from the front surface 14 to the panel 18 when the panel 18 is in the deployed position. The upper airbag 46 may reduce vertical movement of the occupant during the vehicle impact. The upper airbag 46 may be disposed in the vehicle seat 10 in an uninflated position and may inflate toward the panel 18 to an inflated position. The upper airbag 46 may include an inflator (not shown) to inflate the upper airbag 46 to the inflated position.

The vehicle seat 10 may include a headrest 48, as shown in FIGS. 1A-8B. The tether 40, the net 44, and the upper airbag 46 may be supported by the headrest 48, and may extend from the headrest 48 to the panel 18 in the deployed position. The upper airbag 46 may be disposed in the headrest 48 in an uninflated position (not shown). In the inflated position, as shown in FIG. 5B, the upper airbag 46 may extend from the headrest 48 to the panel 18.

During the vehicle impact, the panel 18 and the second panel 22 are moved from the stowed position to the deployed position. The vehicle seat 10 may include one or more devices to move the panel 18 and the second panel 22 to the deployed position. For example, as described below, the vehicle seat 10 may include an actuator 52 that rotates a pinion 50 that moves a first rack 54 attached to the panel 18 and a second rack 56 attached to the second panel 22. Alternatively, the seat 10 may include another device that moves the panel 18 and the second panel 22 along the track 32, e.g., a bearing, a wheel, a slider, a spring, etc.

Figure 7A:
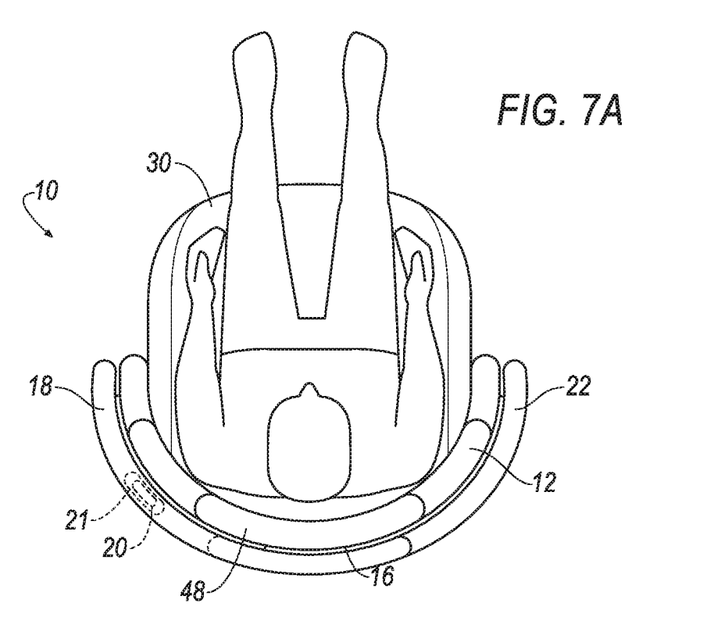
FIGS. 7A-7B illustrate the vehicle seat with a pinion engaging the panel and a second panel in the respective stowed positions.
Figure 7B:
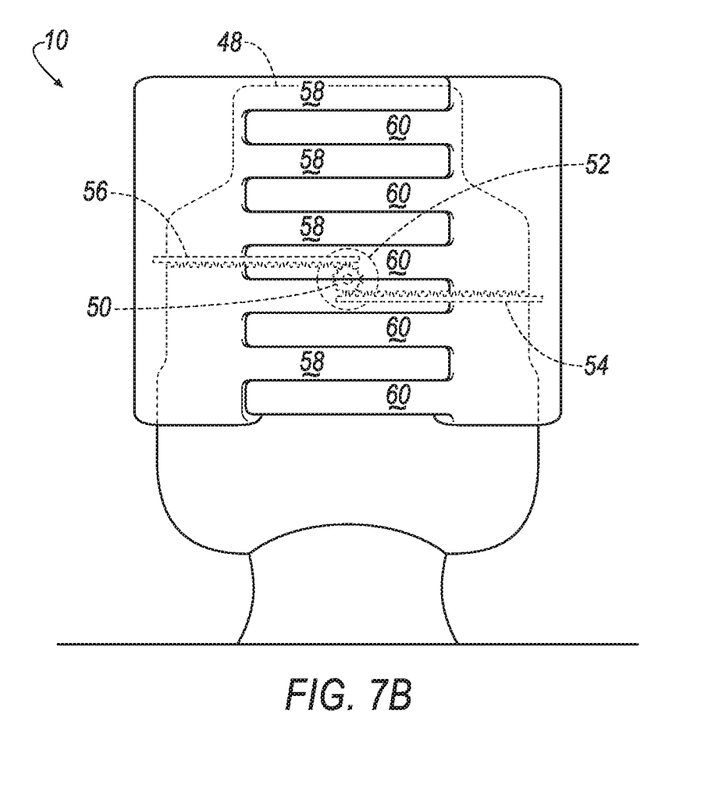
Figure 8A:
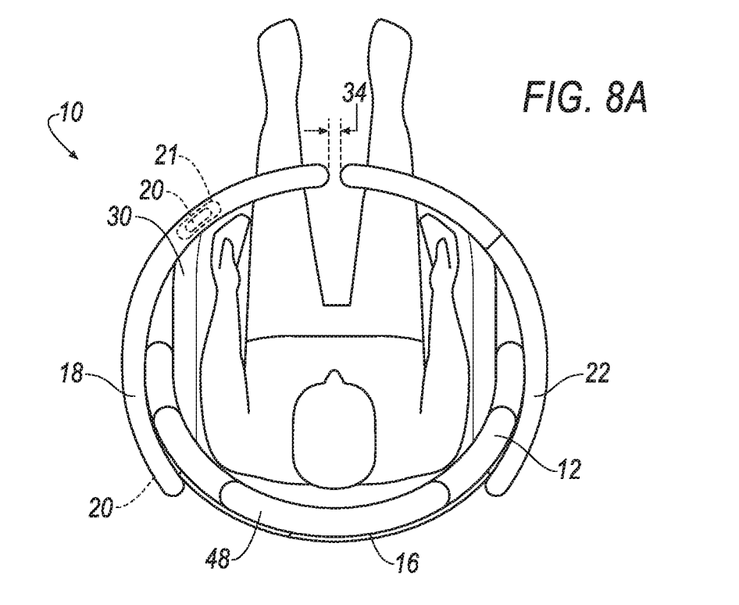
FIGS. 8A-8B illustrate the vehicle seat with the pinion engaging the panel and the second panel in the respective deployed positions.
Figure 8B:
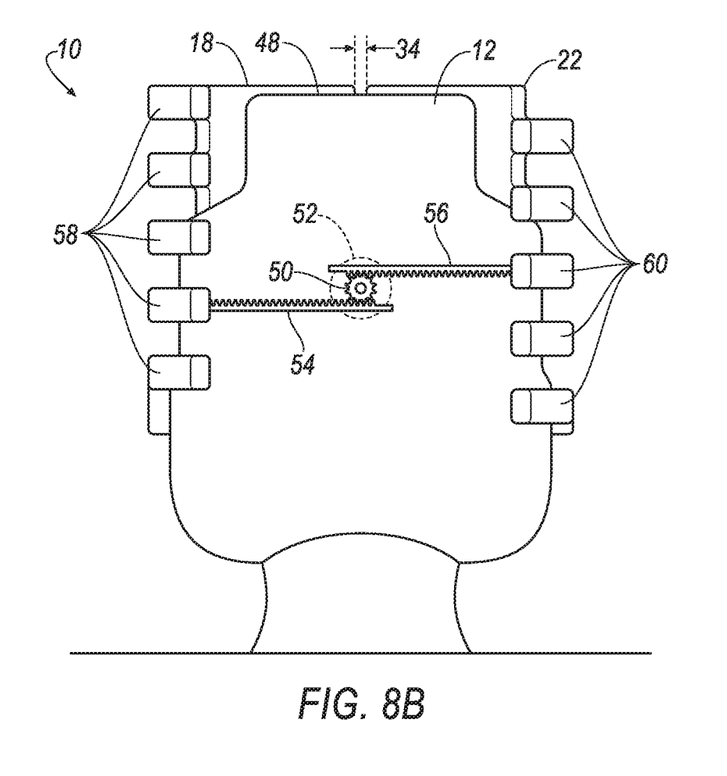

The vehicle seat 10 may include the pinion 50, as shown in FIGS. 7B and 8B. The pinion 50 may be attached to the rear surface 16 of the seat back 12. The pinion 50 may be engaged with the panel 18 and the second panel 22. The pinion may be arranged to extend the panel 18 and the second panel 22 to the respective deployed positions.

The vehicle seat 10 may include the actuator 52 to rotate the pinion 50. The actuator 52 may be a motor. The pinion 50 may be attached to the motor. The motor may be supported by the seat back 12 and disposed in the rear surface 16. The motor may rotate the pinion 50. The motor may be connected to the panel 18 and the second panel 22.

The vehicle seat 10 may include a first rack 54 and a second rack 56, as shown in FIGS. 7B and 8B. The first rack 54 may be attached to the panel 18. The second rack 56 may be attached to the second panel 22. For example, the panel 18 may have a plurality of digits 58 and the second panel 22 may have a plurality of second digits 60. The digits 58 and the second digits 60 may be finger-like extensions from a portion of the panel 18 and the second panel 22, respectively. The digits 58 and the second digits 60 may engage each other in an interlocking manner, as shown in FIG. 7B. The first rack 54 may be fixed to one of the digits 58, and the second rack 56 may be fixed to one of the second digits 60. The pinion 50 may engage the first rack 54 and the second rack 56. When the motor rotates the pinion 50, the pinion 50 may move the first rack 54 and the second rack 56 in opposing directions, deploying the panel 18 and the second panel 22 to the respective deployed positions. By affixing the first rack 54 to one of the digits 58 and the second rack 56 to one of the second digits 60, the first rack 54 and the second rack 56 may extend along the seat back 12 farther than the panel 18 and the second panel 22 would extend without the digits 58 and the second digits 60. The digits 58 and the second digits 60 thus allow the first rack 54 and the second rack 56 to extend farther and the pinion 50 to move the first rack 54 and the second rack 56 (and thus the panel 18 and the second panel 22) to the respective deployed positions.

The actuator 52 may be a pyrotechnic device. The pyrotechnic device may be disposed in the rear surface 16 of the seat back 12. The pyrotechnic device may be arranged to move the panel 18 to the deployed position. The pyrotechnic device may be arranged to move the second panel 22 to the deployed position. Alternatively, the vehicle seat 10 may include a second pyrotechnic device (not shown) arranged to move the second panel 22 to the deployed position. The pyrotechnic device may, upon ignition, rotate the pinion 50 to move the panel 18 and the second panel 22 to the respective deployed positions.

As shown in FIG. 9, the energy absorbing system 26 may include an impact sensing subsystem 28. The impact sensing subsystem 28 may include an impact sensor 62 and a controller 64. The controller 64 is in communication with the actuator 52 and the airbag 20 and may include a processor 66 and a memory 68. The actuator 52 may be the motor or the pyrotechnic device, as described above. The memory 68 stores instructions executable by the processor 66 to control the actuator 52 and the airbag module 21. The controller 64 may be programmed to, upon identification of an impact, cause triggering of the actuator 52 and the airbag module 21 (e.g., the inflator in communication with the airbag 20), causing the panel 18 and the second panel 22 to move to the deployed position and the airbag module 21 to inflate the airbag 20 to the inflated position. The pinion 50 may be arranged to extend the panel 18 to the deployed position when the actuator 52 receives an instruction from the impact sensor 62. Thus, the panel 18 may be arranged to move to the deployed position upon receiving an instruction from the impact sensor 62 via the controller 64.

The impact sensor 62 may be in communication with the controller 64. The impact sensor 62 is programmed to detect an impact to the vehicle 24. The impact sensor 62 may be of any suitable type, for example, post-contact sensors such as accelerometers, pressure sensors, and contact switches; and pre-impact sensors such as radar, LIDAR, and vision-sensing systems. The vision systems may include one or more cameras, CCD image sensors, CMOS image sensors, etc. The impact sensor 62 may be located at numerous points in or on the vehicle 24.

To facilitate communications, the controller 64, the impact sensor 62, the actuator 52, and other components in the vehicle 24 may be connected to a communication bus 70, such as a controller area network (CAN) bus, of the vehicle 24. The controller 64 may use information from the communication bus 70 to control the triggering of the actuator 52. The actuator 52 may be connected to the controller 64 or may be connected to the communication bus 70.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. A vehicle seat, comprising:
   a seat back having a front surface and a rear surface;
   a panel movable along the rear surface from a stowed position adjacent the rear surface to a deployed position facing the front surface; and
   an airbag supported on the panel and inflatable toward the front surface along a surface of the panel facing the front surface to an inflated position in which the airbag contacts the panel.

2. The seat of claim 1, further comprising a tether extending from the front surface to the panel when the panel is in the deployed position.

3. The seat of claim 1, further comprising a net extending from the front surface to the panel when the panel is in the deployed position.

4. The seat of claim 1, further comprising a second panel movable away from the panel along to the rear surface from a stowed position adjacent the panel to a deployed position facing the front surface.

5. The seat of claim 4, wherein, when the panel and the second panel are each in the deployed position and the airbag is in the inflated position, the airbag contacts the panel and the second panel.

6. The seat of claim 4, wherein the panel and the second panel define a gap when the panel and the second panel are in the respective deployed positions, and the airbag extends across the gap in the inflated position from the panel to the second panel.

7. The seat of claim 1, further comprising a second airbag supported in the panel inflatable to an inflated position, wherein when the panel is in the deployed position, the second airbag is beneath the airbag.

8. The seat of claim 1, further comprising a motor disposed in the rear surface and connected to the panel.

9. The seat of claim 8, wherein the motor is arranged to move the panel to the deployed position.

10. The seat of claim 1, further comprising a headrest and a second airbag disposed in the headrest inflatable to an inflated position, wherein when the panel is in the deployed position, the second airbag is in the inflated position and extends from the headrest to the panel.

11. The seat of claim 1, further comprising an impact sensor, wherein the panel is arranged to move to the deployed position upon receiving an instruction from the impact sensor.

12. The seat of claim 1, further comprising a pyrotechnic device disposed in the rear surface and arranged to move the panel to the deployed position.

13. An energy absorbing system, comprising:
    a seat;
    a first panel movably attached to the seat and extendable to a deployed position;
    a second panel movably attached to the seat and extendable to a deployed position;
    a pinion engaged with the first panel and the second panel and attached to the seat; and an airbag supported on the first panel inflatable toward the seat along a surface of the first panel facing a front surface of the seat to an inflated position;

wherein when the first panel is in the deployed position and the airbag is in the inflated position, the airbag contacts the first and second panels.

14. The system of claim 13, wherein the first panel and the second panel define a gap when the first panel and the second panel are in the respective deployed positions, and the airbag extends across the gap in the inflated position from the first panel to the second panel.

15. The system of claim 13, further comprising a tether extending from the seat to the first panel when the first panel is in the deployed position.

16. The system of claim 13, further comprising a net extending from the seat to the first panel when the first panel is in the deployed position.

17. The system of claim 13, further comprising a second airbag supported in the first panel inflatable to an inflated position, wherein when the first panel is in the deployed position, the second airbag is beneath the airbag.

18. The system of claim 13, further comprising a headrest and a second airbag disposed in the headrest inflatable to an inflated position, wherein when the first panel is in the deployed position, the second airbag is in the inflated position and extends from the headrest to the first panel.

19. The system of claim 13, wherein the pinion is arranged to extend the first panel and the second panel to the respective deployed positions.

20. The system of claim 13, further comprising an impact sensor, wherein the pinion is arranged to extend the first panel to the deployed position upon receiving an instruction from the impact sensor.

* * * * *